United States Patent
Sakai

(10) Patent No.: US 6,915,064 B1
(45) Date of Patent: Jul. 5, 2005

(54) APPARATUS AND METHOD FOR RECORDING ELEMENTARY STREAMS

(75) Inventor: Ryuichi Sakai, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1063 days.

(21) Appl. No.: 09/651,890

(22) Filed: Aug. 30, 2000

(30) Foreign Application Priority Data

Aug. 30, 1999 (JP) .......................... 11-243243

(51) Int. Cl.⁷ .......................... H04N 5/91; H04N 11/00; H04N 7/16
(52) U.S. Cl. .......................... 386/46; 348/460; 348/461; 348/462; 725/140
(58) Field of Search .......................... 386/83, 46, 1, 386/109, 27, 33, 101; 721/140; 348/460, 461–462; 725/140, 152; 345/327

(56) References Cited

U.S. PATENT DOCUMENTS 5,648,960 A * 7/1997 Sakazaki et al. ............ 370/498
6,525,775 B1 * 2/2003 Kahn et al. .................. 348/460

FOREIGN PATENT DOCUMENTS

| EP | 0 749 244 A2 | 12/1996 |
| GB | 2 333 017 A | 7/1999 |
| WO | WO 98/43415 | 10/1998 |

* cited by examiner

Primary Examiner—Robert Chevalier
Assistant Examiner—Jamie Vent
(74) Attorney, Agent, or Firm—McDermott Will & Emery LLP

(57) ABSTRACT

A video recording and reproducing apparatus is provided which is capable of, even if the number of elementary streams (ES) of bits of a program to be recorded is too large and all the elementary streams can hardly be recorded, carrying out a recording operation with ease substantially corresponding to the direction of the user. The apparatus allows an ES selector to identify the elementary streams of video data, audio data, and their relevant data video in the stream of bits received from its program selector and, when the number of the elementary streams is higher than a given setting, pick up elementary streams which satisfy the predetermined requirements while deleting the other elementary streams. The elementary streams are then recorded by a recorder/player in the apparatus. Even if the elementary streams of bits are not all recorded, the elementary streams which satisfy the predetermined requirements can readily be recorded.

12 Claims, 4 Drawing Sheets

| Transponder (1) | Program 1 | ES 1 (Video) |
| | | ES 2 (Audio 1) |
| | | ES3 (Audio 2) |
| | | ES 4 (Data 1) |
| | | ES 5 (Data 2) |
| | Program 2 | ES 1 (Video) |
| | | ES 2 (Audio 1) |
| | Program 3 | ES 1 (Audio) |
| Transponder (2) | Program 1 | ES 1 (Video) |
| | | ES 2 (Audio) |
| | Program 2 | ES 1 (Video) |
| | | ES 2 (Audio) |
| | Program 3 | ES 1 (Video) |
| | | ES 2 (Audio) |
| | Program 4 | ES 1 (Video) |
| | | ES 2 (Audio) |

APPARATUS AND METHOD FOR RECORDING ELEMENTARY STREAMS

FIELD OF THE INVENTION

The present invention relates to a video recording and reproducing apparatus, such as a digital video tape-recorder, for recording digital broadcast signals in a bit stream form.

BACKGROUND OF THE INVENTION

It is known to use a video recording and reproducing apparatus, such as a digital video tape-recorder, for recording received data of digital broadcasting signals in a bit stream form. FIG. 2 illustrates transponders in relation to programs and elementary streams (ES). As shown in FIG. 2, a plurality of programs for digital broadcasting are multiplexed in one transponder (equivalent to a channel in the analog broadcasting). One program consists of at least one elementary stream. In a conventional video recording and reproducing apparatus such as a digital video tape-recorder, a stream of bits of data about a program(s) specified by a user only are recorded while data of any other programs are deleted for minimizing the bit rate for recording.

FIG. 3 is a block diagram showing an arrangement of a conventional video recording and reproducing apparatus. The conventional video recording and reproducing apparatus comprises:

(a) tuner 21 for converting data of a digital broadcasting signal in a transponder into a stream of bits which are then outputted;

(b) program selector 22 for deleting bits other than of a program selected by the user from the stream of bits released from tuner 21;

(c) decoder 23 for separating the stream of bits received from program selector 22 into elementary streams, namely video data and audio data, and decoding the elementary streams to a video signal and an audio signal;

(d) output section 24 for transferring the video signal and the audio signal received from decoder 23 to an external audio-video apparatus such as a television receiver; and (e) recorder/player 25 for recording the stream of bits released from program selector 22.

An action of the conventional video recording and reproducing apparatus having the foregoing arrangement is now explained. When a particular program is specified by the user, tuner 21 tunes in to a broadcast transponder which is including the program and converts digital data of the program received from the transponder into a stream of bits which are then transferred to program selector 22. Program selector 22 picks up the stream of bits data of the program specified by the user and feeds decoder 23 with the program as a stream of data excluding any other data. Decoder 23 divides the stream of bits received from program selector 22 into ES of bits, namely video data and audio data, which are then decoded to a video signal and an audio signal. The signals reproduced by decoder 23 are transferred to output section 24 from which they are distributed to an external audio-video apparatus such as a television receiver.

Also, the data of the program specified by the user and separated from the intercepted signal, unwanted data hence deleted, is transferred as a stream of bits from program selector 22 to recorder/player 25. The stream of bits of the program data are then recorded by recorder/player 25.

The conventional apparatus however fails to check the number of ES of bits before recording. Accordingly, if the apparatus is capable of recording only twelve ES of bits at maximum because of the performance of its LSI and the number of ES of bits received is greater than twelve, its recording operation may be carried out at random regardless of the direction of the user.

SUMMARY OF THE INVENTION

The present invention provides a video recording and reproducing apparatus which can easily carry out a recording action substantially corresponding to the direction of the user. In the video recording and reproducing apparatus of the present invention, the number of elementary streams (Es) is counted before recorded. When the number of ES exceeds a particular setting, ones of the ES which satisfy the predetermined requirements are picked up while the others are all deleted.

In the present invention, as embodied and broadly described herein, the apparatus of the invention may comprise a recording and reproducing apparatus comprising: a tuner for receiving a digital broadcast signal from a transponder and converting data of the digital broadcast signal into a stream of bits carrying data of a group of programs, and outputting the stream of bits; a program selector for separating data of a program selected by a user from the stream of bits, and outputting the data of the program as a stream of program bits; a decoder for separating elementary streams (ES) which include at least one of: encoded signals of video data, audio data, and program related data from the stream of program bits and decoding the elementary streams; an output section for transferring the elementary streams to an external apparatus; an ES selector for selecting elementary streams in data of a program provided by said program selector; and a recorder/player for recording the elementary streams from said ES selector.

In the above recording and reproducing apparatus, when the number of the elementary streams is higher than a particular setting, the ES selector may select elementary streams which satisfy predetermined requirements such that the number of selected elementary streams is no more than the particular setting.

Also in the above recording and reproducing apparatus, the predetermined requirements may be an order of priority for selection of the elementary streams such that elementary streams of a first priority are selected before elementary streams of a second priority, and elementary streams of a second priority are selected before elementary streams of a third priority.

In the present invention, the method of the invention may comprise a method of recording elementary streams contained in a digital broadcast signal comprising the steps of: receiving a data stream having elementary streams; identifying elementary streams as carrying video data, audio data, or program related data; determining if the number of identified elementary streams is higher than a set number; if the number of identified elementary streams is higher than the set number, then selecting elementary streams according to a predetermined requirement; and providing the selected elementary streams to a recording/playback device.

In the above method the step of selecting elementary streams according to a predetermined requirement may comprise the step of selecting the elementary streams according to an order of priority such that elementary streams of a first priority are selected before elementary streams of a second priority, and elementary streams of a second priority are selected before elementary streams of a third priority.

Advantages of the present invention will become apparent to those skilled in the art from the following detailed description of the exemplary embodiments of the present invention. The invention itself can better be understood by reference to the following detailed description and the accompanying drawings.

BRIEF DESCRIPTION OF THE DRAWINGS

In the various figures, identical or similar elements, structures and operations are similarly numbered. Any differences between similarly numbered elements, structures and operations in the various figures will be apparent to the artisan from the figures or from the following description.

DETAILED DESCRIPTION OF THE PREFERRED EMBODIMENTS

Reference will now be made in detail to the presently preferred embodiments of the invention, examples of which are illustrated in the accompanying drawings.

Figure 1:
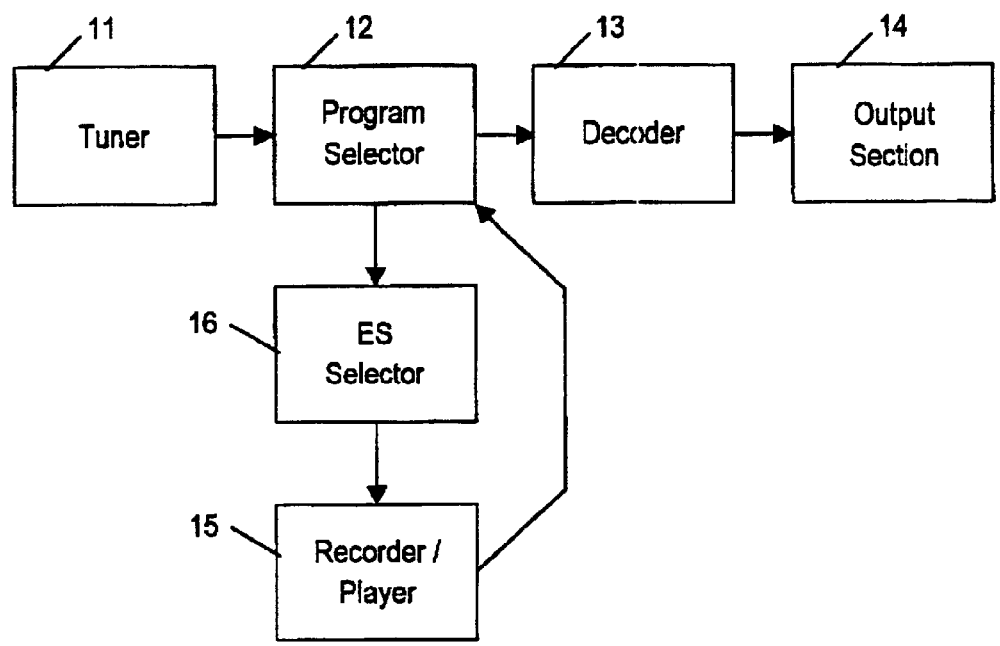
FIG. 1 illustrates an arrangement of a video recording and reproducing apparatus according to embodiment 1 of the present invention.
Figure 2:
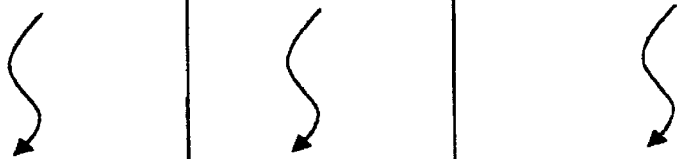
FIG. 2 illustrates the relation between transponders and a combination programs and elementary streams (ES) of bits.
Figure 3:
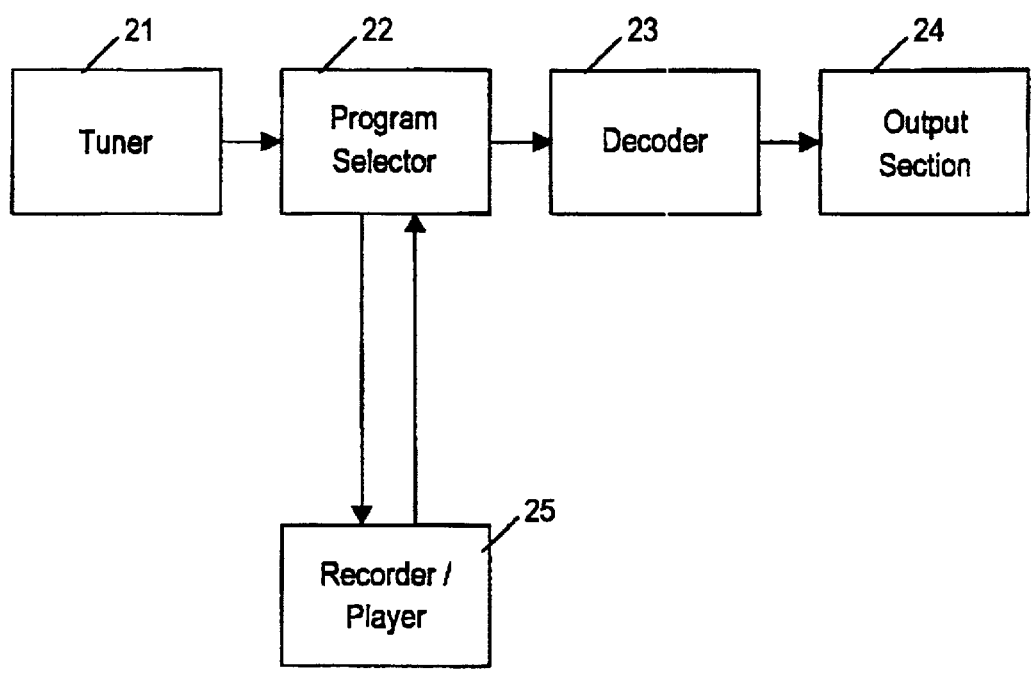
FIG. 3 illustrates an arrangement of a conventional video recording and reproducing apparatus.

FIG. 1 is a block diagram showing an arrangement of the video recording and reproducing apparatus of an embodiment of the present invention. Tuner 11 intercepts a digital broadcast signal radiated from a selected transponder and converts its data including a group of programs into a stream of bits which is then outputted. Then, program selector 12 picks up the data of one program selected by the user from the output of tuner 11 and releases it as a stream of bits excluding the data of any other programs. Decoder 13 divides the stream of bits carrying video data, audio data, and their relevant data in encoded forms into elementary streams (ES) of bits which are then decoded separately. Output section 14 transfers a signal output of decoder 13, which includes video data, audio data, and their relevant data , to an external apparatus. ES selector 16 identifies the elementary streams (ES) of bits in the program data released from program selector 12 and, when the number of the identified ES is higher than a particular setting, selects ones of the ES which satisfy the predetermined requirements while deletes the remaining ES. Recorder/player 15 records the selected ES released as a stream of bits from ES selector 16.

An action of the apparatus will now be described. When a particular program is specified by the user, tuner 11 tunes in to a transponder carrying the program and converts a digital broadcast signal output of the transponder into a stream of bits which is then transferred to program selector 12. Then, program selector 12 picks up a data about the program specified by the user from the stream of bits and transfers it to decoder 13 in the form of a stream of bits excluding data about any other programs. The stream of bits released from program selector 12 is divided by decoder 13 into ES of bits carrying video data and audio data which are then decoded into a video signal and an audio signal. The signals released from decoder 13 are transferred to output section 14 from which they are further distributed to an external audio-video apparatus such as a television receiver.

Figure 4:
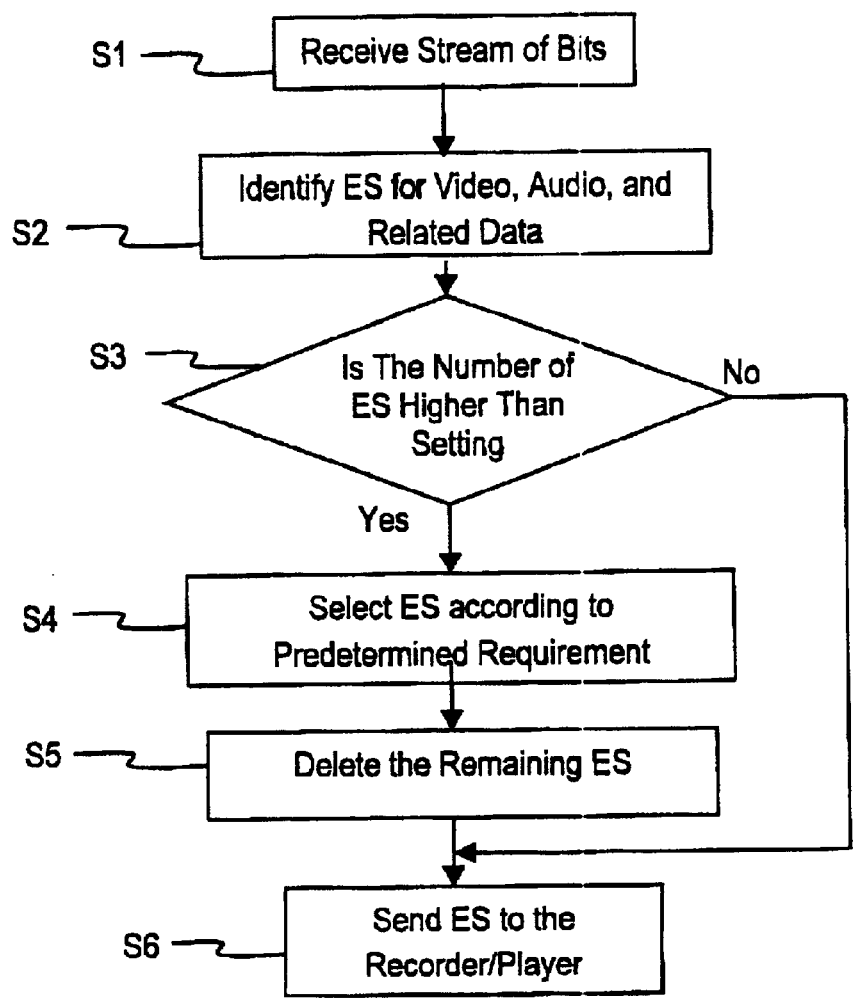
FIG. 4 is a flow diagram which illustrates the operation of the ES Selector.

As shown in FIG. 4, program selector 12 also picks up a stream of bits carrying the program data specified by the user and transfers it to ES selector 16 (step S1) while deleting the data of any other programs. ES selector 16 identifies ES for video data, audio data, and program related data, such as program information and control data (step S2). When the number of ES is higher than the particular setting (YES in step S3), the ES selector 15 selects ones of the ES which satisfy predetermined requirements (step S4) while the remaining ES are deleted (step S5). Then the selected ES is provided to the recorder/player 16 (step S6). If the number of ES is not higher than the particular setting (NO in Step S3), then the ES selector 15 allows all of the ES data to be provided to the Recorder/Player 16.

For example, the D-VHS system allows up to twelve of ES to be recorded. In case that the stream of bits released from program selector 12 contains thirteen or more of ES, ES selector 16 may give the first priority to ES carrying the video data, the second priority to ES carrying the audio data, the third priority to ES carrying their relevant data, and so on. In this manner, twelve of ES chosen while the remaining of ES is deleted. The twelve ES selected by ES selector 16 are then transferred to recorder/player 15 where they are recorded in a stream of bits.

As set forth above, the video recording and reproducing apparatus of the present invention is capable of readily picking up and recording ES which duly satisfy the predetermined requirements even if the number of ES released from the program selector is higher than a particular setting and the recording of all ES is hardly allowed, and its recording operation action can hence be corresponding substantially to the direction of the user.

The above description is based on ES selector 16 giving the first priority to ES carrying the video data, the second priority to ES carrying the audio data, and the third priority to ES carrying elementary streams (ES) having program related data. It may also be practiced with equal success to give the first priority to ES carrying data about the subscriber contract and the second priority to ES carrying their relevant data. Furthermore, when it is judged in ES selector 16 that the number of ES is too large, the apparatus may give no priority and delete all ES without recording. This procedure is effective for handling pay-per-view programs which require payment when recorded.

Although the present invention has been fully described by way of examples with reference to the accompanying drawings, it is to be noted that various changes and modifications will be apparent to those skilled in the art. Therefore, unless such changes and/or modifications depart from the scope of the present invention as defined by the appended claims, they should be construed as being included therein.

What is claimed is:

1. A video recording and reproducing apparatus comprising:

a tuner for receiving a digital broadcast signal from a transponder and converting data of the digital broadcast signal into a stream of bits carrying data of a group of programs, and outputting the stream of bits;

a program selector for separating data of a program selected by a user from the stream of bite, and outputting the data of the program as a stream of program bits;

a decoder for separating elementary streams (ES) which include at least one of: encoded signals of video data, audio data, and program related from the stream of program bits and decoding the elementary streams;

an output section or transferring the elementary streams to an external apparatus;

an ES selector for selecting elementary streams in data of a program provided by said program selector; and a recorder/player for recording the elementary streams from said ES selector, wherein, when the number of the elementary streams is higher than a particular setting, the ES selector selects elementary streams which satisfy predetermined requirements such that the number of selected elementary streams is no more than the particular setting.

2. The video recording and reproducing apparatus according to claim 1, wherein elementary streams which are not selected are deleted.

3. The video recording and reproducing apparatus according to claim 1, wherein the particular setting is twelve elementary streams.

4. The video recording and reproducing apparatus according to claim 1, wherein the predetermined requirements are an order of priority for selection of the elementary streams such that elementary streams of a first priority are selected before elementary streams of a second priority, and elementary streams of a second priority are selected before elementary streams of a third priority.

5. The video recording and reproducing apparatus according to claim 4, wherein elementary streams carrying video data have a first priority, elementary streams carrying audio data have a second priority, and elementary streams carrying program related data have a third priority.

6. The video recording and reproducing apparatus according to claim 4, wherein elementary streams carrying data of a subscriber contract have a first priority, and elementary streams carrying data relevant to the subscriber contract have a second priority.

7. A method of recording elementary streams contained in a digital broadcast signal comprising the steps of:

receiving a data stream having elementary streams;

identifying elementary streams as carrying video data, audio data, or program related data;

determining if the number of identified elementary streams is higher than a set number, if the number of identified elementary streams is higher than the set number, then selecting elementary streams according to a predetermined requirement; and providing the selected elementary streams to a recording/playback device.

8. The method of recording elementary streams contained in a digital broadcast signal according to claim 7, further comprising the step of deleting elementary streams which are not selected.

9. The method of recording elementary streams contained in a digital broadcast signal according to claim 7, wherein the set number is twelve elementary streams.

10. The method of recording elementary streams contained in a digital broadcast signal according to claim 7, wherein the step of selecting elementary streams according to a predetermined requirement comprises the step of selecting the elementary streams according to an order of priority such that elementary streams of a first priority are selected before elementary streams of a second priority, and elementary streams of a second priority are selected before elementary streams of a third priority.

11. The method of recording elementary streams contained in a digital broadcast signal according to claim 10, wherein the order of priority is such that elementary streams carrying video data have a first priority, elementary streams carrying audio data have a second priority, and elementary streams carrying program related data have a third priority.

12. The method of recording elementary streams contained in a digital broadcast signal according to claim 10, wherein the order of priority is such that elementary streams carrying data of a subscriber contract have a first priority, and elementary streams carrying data relevant to the subscriber contract have a second priority.

* * * * *